(12) United States Patent
De Jonge et al.

(10) Patent No.: US 6,284,837 B1
(45) Date of Patent: Sep. 4, 2001

(54) PRESSURE-SENSITIVE REMOVABLE ADHESIVES BASED ON POLYACRYLATES, PREPARATION PROCESS AND ARTICLES CONTAINING THEM

(75) Inventors: Johan De Jonge, Steenbergen (NL); Rodney M. Weston, Milwaukee, WI (US)

(73) Assignee: Ato Findley Inc., WI (US)

( * ) Notice: Subject to any disclaimer, the term of this patent is extended or adjusted under 35 U.S.C. 154(b) by 0 days.

(21) Appl. No.: 09/122,395

(22) Filed: Jul. 24, 1998

(51) Int. Cl.[7] .............................. C08K 5/11; C08L 33/06; B32B 7/12
(52) U.S. Cl. .................. 524/773; 524/317; 524/556; 524/559; 524/833; 428/355 AC
(58) Field of Search ..................................... 524/773, 556, 524/559, 833, 317; 428/355 AC

(56) References Cited

U.S. PATENT DOCUMENTS

| | | | | |
|---|---|---|---|---|
| 4,234,467 | * | 11/1980 | Ryrfors et al. | 524/833 |
| 4,939,190 | | 7/1990 | Tomioka et al. . | |
| 5,133,970 | * | 7/1992 | Petereit et al. | 526/313 |
| 5,315,055 | | 5/1994 | Butcher, Jr. . | |
| 5,532,300 | * | 7/1996 | Koubek et al. | 524/833 |
| 5,550,181 | * | 8/1996 | Scholz | 524/833 |
| 5,563,205 | * | 10/1996 | Mayer et al. | 524/556 |

FOREIGN PATENT DOCUMENTS

| | | |
|---|---|---|
| A 54-023641 | 2/1979 | (JP) . |
| A 58-185668 | 10/1983 | (JP) . |
| A 08-231937 | 9/1996 | (JP) . |
| WO 90/15111 | 12/1990 | (WO) . |

* cited by examiner

Primary Examiner—Tae H. Yoon
(74) Attorney, Agent, or Firm—Pennie & Edmonds LLP

(57) ABSTRACT

The present invention relates to pressure-sensitive removable adhesives based on polyacrylates, characterized in that they comprise a compound of formula:

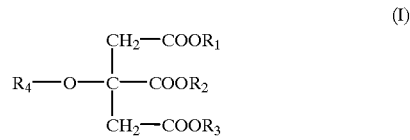

(I)

wherein $R_1$, $R_2$ and $R_3$, which are identical or different, represent a linear or branched $C_1$–$C_8$, preferably $C_2$–$C_6$, alkyl radical; and $R_4$ represents H or an acyl radical $COR_5$ wherein $R_5$ is a linear or branched $C_1$–$C_3$ alkyl radical. The present invention also relates to a process for the preparation of said adhesives. The present invention further relates to adhesive labels and tapes comprising said adhesives.

9 Claims, No Drawings

PRESSURE-SENSITIVE REMOVABLE ADHESIVES BASED ON POLYACRYLATES, PREPARATION PROCESS AND ARTICLES CONTAINING THEM

1. BACKGROUND OF THE PRESENT INVENTION

1.1. Technical Field

Pressure-sensitive adhesives are adhesives which, in the dry state, are permanently adhesive at room temperature and adhere firmly to various surfaces by simple contact under a slight manual pressure.

Pressure-sensitive adhesives are generally characterized by the following three properties: the adhesive power, the peel strength and the shear strength. The first property reflects the ability of the adhesive to rapidly adhere; the second defines the ability to withstand withdrawal by peeling; and the third characterizes the ability of the adhesive to maintain its initial position when it is subjected to shear forces.

In the field of industrial adhesion, it is generally necessary to specifically adapt the adhesive to the materials to be assembled and to the uses which are made of them. This is obtained by suitably balancing the above-mentioned properties (adhesive power, peel strength and shear strength) as a function of the desired aim.

1.2. Description of Related Art

Acrylic polymers constitute a particularly advantageous class of compounds for the preparation of pressure-sensitive adhesives. They are transparent and colorless, do not yellow under the influence of solar radiation and exhibit good resistance to oxidation. In addition, some of these polymers exhibit intrinsic adhesive properties generally superior to most other polymers.

Pressure-sensitive adhesives based on acrylic polymers, namely polyacrylates and polymethacrylates, are widely used in the field of labelling, in particular for producing self-adhesive labels and tapes. Poly(meth)-acrylates are generally applied in solution in an organic solvent or in the form of an aqueous emulsion.

For some years, increasing interest has been directed at aqueous emulsions, which exhibit certain advantages:

they are incombustible;

they do not contain any solvent capable of escaping into the atmosphere;

their adhesive nature can be reinforced by the introduction of a tackifying agent;

they exhibit a high solids content (generally greater than 50% by weight), good resistance to ageing and great ease of use.

These emulsions are obtained by emulsion polymerization in water of (meth)acrylic monomers, with which is generally combined a tackifying agent, such as a natural resin or a resin of petroleum origin, or an elastomer.

The latter compounds can be incorporated by prior dissolution in a hydrocarbon solvent, followed by an addition of water to form an emulsion and by the removal of the solvent. This way of operating exhibits, however, the disadvantage of allowing a not insignificant residual amount of solvent to remain in the final emulsion.

The most common incorporation consists of dissolving the tackifying agent or the elastomer in the acrylic monomers before carrying out the polymerization reaction. Numerous documents report such a way of operating:

For example, in U.S. Pat. No. 5,315,055 and WO 90/15111, a pressure-sensitive adhesive is obtained for which the peel force is increased by dissolving, in acrylic monomers, a tackifying resin exhibiting a molecular weight of between 500 and 5000 and an aromatic content of at least 10% by weight.

In JP-A-08-231937 the introduction of 5 to 30 parts by weight of a tackifying resin and of a polymerizable anionic emulsifier into 100 parts by weight of acrylic monomers makes it possible to obtain a self-adhesive which adheres to polytetrafluorethylene (PTFE).

In JP-A-54-023641, a permanent adhesive which can adhere to varied substrates is prepared by dissolving a compound of high molecular weight in a mixture of acrylic monomers, of copolymerizable monomers, and of an emulsifier. The compound of high molecular weight is a tackifying resin or an elastomer.

In JP-A-58-185668, a terpene-phenol or terpene-alkyl phenol resin is continuously added to a mixture of acrylic monomers and of copolymerizable monomers, optionally in the presence of an emulsifier, to form an aqueous emulsion having in particular good resistance to water.

Finally, in U.S. Pat. No. 4,939,190, provision is made to prepare pressure-sensitive adhesives having the ability to adhere to polyolefins. The process, in two stages, consists in polymerizing an ethylenically unsaturated monomer in the presence of a tackifying resin, in order to form an emulsion in which the particles are composed of a resin core and of an outer polyacrylate layer, and subjecting the said emulsion to a polymerization in the presence of an ethylenically unsaturated monomer. The emulsion obtained is composed of particles having a multilayer structure.

The pronounced adhesive nature of the adhesive emulsions which have just been mentioned proves to be a major disadvantage for applications involving labelling. These adhesives can be described as permanent self-adhesives, that is to say that it is difficult to remove them without part of the adhesive, indeed even the label or the tape, remaining on the substrate to which they have been affixed.

2. SUMMARY OF THE INVENTION

The present invention relates to pressure-sensitive removable adhesives. More specifically, the invention relates to aqueous-phase adhesives of the acrylic emulsion type which exhibit an excellent adhesive nature and good adhesion to substrates of varied nature.

The present invention is directed to pressure-sensitive removable adhesives based on polyacrylates, characterized in that they comprise a compound of formula:

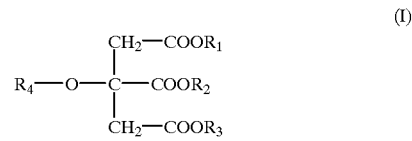

(I)

wherein $R_1$, $R_2$ and $R_3$, which are identical or different, represent a linear or branched $C_1$–$C_8$, preferably $C_2$–$C_6$, alkyl radical; and $R_4$ represents H or an acyl radical $COR_5$ wherein $R_5$ is a linear or branched $C_1$–$C_3$ alkyl radical. The present invention also relates to a process for the preparation of said adhesives. These adhesives are used in particular in the field of labelling. The present invention further relates to adhesive labels and tapes comprising said adhesives.

3. DESCRIPTION OF THE PREFERRED EMBODIMENTS

The present invention provides novel pressure-sensitive adhesives which make it possible to overcome the above-mentioned disadvantages.

The adhesives according to the invention are sensitive to pressure and removable, that is to say that they can be easily removed manually from the substrate, without leaving substantial marks on the latter, and can optionally be placed back on the same substrate or a different substrate.

More specifically, the adhesives according to the invention are aqueous poly(meth)acrylate emulsions, characterized in that they comprise at least one compound of formula:

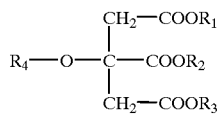

in which:

R$_1$, R$_2$ and R$_3$, which are identical or different, represent a linear or branched C$_1$–C$_8$, preferably C$_2$–C$_6$, alkyl radical and R$_4$ represents H or an acyl radical COR$_5$ wherein R$_5$ is a linear or branched C$_1$–C$_3$ alkyl radical.

The particularly preferred compounds of formula (I) are triethyl citrate (TEC), triethyl acetylcitrate (TEAC), tri-n-butyl citrate (TBC), tri-n-butyl acetylcitrate (TBAC), tri-n-hexyl acetylcitrate (THAC) and tri-n-hexyl n-butyrylcitrate (THBC) and better still tri-n-butyl acetylcitrate (TBAC).

The content of compound of formula (I) can reach 20% by weight of the combined monomers constituting the poly(meth)acrylates. It preferably varies between 2 and 18% and better still between 4.5 and 11%.

The poly(meth)acrylates which can be used according to the invention are those which can be obtained by aqueous emulsion polymerization of a mixture of acrylic monomers comprising at least one alkyl (meth)acrylate, at least one polar copolymerizable monomer and at least one polyunsaturated copolymerizable monomer.

The alkyl (meth)acrylate is chosen from acrylates and methacrylates in which the alkyl radical contains 1 to 12 carbon atoms and preferably 4 to 8 carbon atoms. Mention may be made, by way of example, of butyl acrylate, butyl methacrylate, heptyl acrylate, heptyl methacrylate, octyl acrylate, octyl methacrylate, iso-octyl acrylate, isooctyl methacrylate, 2-ethylhexyl acrylate, 2-ethylhexyl methacrylate, isobutyl acrylate and isobutyl methacrylate. 2-Ethylhexyl acrylate and 2-ethylhexyl methacrylate are particularly preferred.

The polar copolymerizable monomer is chosen from acrylic acid, methacrylic acid, dicarboxylic acids containing ethylenic unsaturation, such as itaconic acid, maleic acid or crotonic acid, acrylamide and methacryl-amide. Acrylic acid and methacrylic acid are preferred.

The polyunsaturated copolymerizable monomer is chosen from compounds containing at least two ethylenic unsaturations, such as hexanediol diacrylate, hexanediol dimethacrylate, pentaerythritol diacrylate, pentaerythritol dimethacrylate, polyethylene glycol diacrylate, polyethylene glycol dimethacrylate, polypropylene glycol diacrylate, polypropylene glycol dimethacrylate, poly(ethylene)(propylene) glycol diacrylate, poly(ethylene)-(propylene) glycol dimethacrylate, trimethylolpropane triacrylate and trimethylolpropane trimethacrylate. Trimethylolpropane triacrylate and trimethylolpropane trimethacrylate are preferred.

The mixture of the above-mentioned monomers generally comprises:
85 to 98% by weight of alkyl (meth)acrylate
1 to 5% by weight of polar copolymerizable monomer
1 to 10% by weight of polyunsaturated copolymerizable monomer.
The said mixture of monomers preferably comprises:
90 to 95% by weight of alkyl (meth)acrylate
2 to 4% by weight of polar copolymerizable monomer
3 to 6% by weight of polyunsaturated copolymerizable monomer.

The adhesives according to the invention can be prepared according to the process which consists in dissolving the compound of formula (I) in the mixture of acrylic monomers and polymerizing by the emulsion polymerization technique. The polymerization is carried out in the presence of water in a sufficient amount to enable the reaction to proceed satisfactorily, for example so as to obtain a content of monomers of between 50 and 70% by weight.

The polymerization is carried out in the presence of an emulsifier which is generally chosen from anionic emulsifiers, non-ionic emulsifiers and mixtures of these emulsifiers.

Examples of appropriate anionic emulsifiers are fatty acid alkaline salts, alkaline alkyl sulphates, alkaline alkylsulphonates, alkaline alkylarylsulphonates, alkaline alkylsulphosuccinates, alkaline alkyl phosphates and alkaline alkylphosphonates.

Examples of appropriate non-ionic emulsifiers are the polycondensates of ethylene oxide and/or of propylene oxide with various hydroxylated organic compounds, such as aliphatic alcohols, alkylphenols and fatty acids.

When a mixture of emulsifiers is used, it is advantageous to use a relatively hydrophobic emulsifier and a relatively hydrophilic emulsifier. A relatively hydrophobic emulsifier exhibits a cloud point, in 1% aqueous solution, of less than 88° C. and a relatively hydrophilic emulsifier exhibits a cloud point, in 1% aqueous solution, of greater than or equal to 88° C.

The emulsifier content generally represents 1 to 10% by weight of the combined acrylic monomers and preferably 1 to 8%.

During the polymerization, it is possible to combine protective colloids with the emulsifier for the purpose of stabilization. Mention may be made, by way of illustration, of cellulose derivatives, such as methyl-celluloses, hydroxyethylcelluloses, hydroxypropylcelluloses and acetylcelluloses, poly(vinyl alcohol)s and polyvinylpyrrolidones.

The amount of these protective colloids depends on the desired viscosity and on the desired stabilization. An amount of 1 to 3% by weight with respect to the combined monomers is generally sufficient.

The catalysts which can be used for the polymerization comprise organic peroxides, such as hydrogen peroxide or tert-butyl hydroperoxide, inorganic peroxides, such as sodium persulphate or ammonium persulphate, and combined redox catalysts comprising these oxidizing and reducing agents, such as sodium or zinc formaldehydesulphoxylate, ferrous salts, sodium sulphide, sodium bisulphite, sodium thiosulphate and ascorbic acid.

The catalyst can be added from the beginning of the polymerization, for example to the aqueous emulsifying solution, or gradually during the polymerization, one or more times.

The catalyst content is generally between 0.01 and 3% by weight of the monomers and preferably 0.01 and 1% by weight. During the polymerization, the pH is generally maintained at a value of between 2 and 7, preferably 3 and 5. The pH can be adjusted by means of small amounts of acid or of base. It is also possible to add buffer substances known to a person skilled in the art. Mention may be made, by way of illustration, of sodium bicarbonate or disodium phosphate.

On conclusion of the polymerization, the adhesive according to the invention is recovered and is in the form of an aqueous acrylic emulsion with a solids content of between 50 and 74%. The poly(meth)acrylate contained in the adhesive exhibits a transition temperature of between −70 and 0° C., preferably of between −65 and −55° C.

The removable adhesives according to the invention can additionally contain additives known to a person skilled in the art, for example:

- acids or bases which, by modifying the pH, make possible good compatibility with other emulsions and/or additives. Mention may be made, by way of example, of aqueous ammonia solutions or sodium hydroxide,
- coalescence agents which improve the ability to form a film,
- fillers, such as silica, calcium carbonate or zinc oxide, and/or pigments,
- plasticizers which modify the rheology and the properties of the adhesive. Mention may be made, by way of example, of monomeric phthalates, such as dioctyl phthalate, di-n-butyl phthalate or diisodecyl phthalate, dibenzoates, polyadipates, poly(propylene glycol) alkylphenyl ethers, and chlorinated paraffins,
- conventional tackifying resins, such as natural resins, unmodified or modified, and hydrocarbon resins derived from petroleum,
- foam-suppressants, such as heavy alcohols and their derivatives,
- and bactericides and/or fungicides, such as formaldehyde and its derivatives, benzimidazoles, iso-thiazolones and chloroacetamides.

The labels and the tapes to which the adhesives according to the invention are applied exhibit a low peel strength at 180° (1 to 10 N/25 mm according to the FINAT standard described hereinbelow in the examples) and retain their removable nature over time, in particular over a period of 10 to 12 weeks at room temperature. In addition, it is found that they are withdrawn without the presence of strings of adhesives or of deposits on the substrate. The labels and the tapes retain their integrity after having been withdrawn and can optionally be adhesively rebonded to the same substrate or a different substrate.

The following examples make it possible to illustrate the invention.

In the examples, the following analytical methods are used:

- the viscosity of the emulsion, expressed in mPa·s, is measured at 23° C. according to ASTM standard D 2196 using a Brookfield viscometer (RVT model),
- the size of the particles of the emulsion, expressed in nm, is determined by means of a Mastersizer S analyzer,
- the solids content, expressed as % by weight, is defined according to ASTM standard D 2369-95,
- the peel force at 180° is measured according to the method described in FINAT Technical Handbook, 4th Edition, pp. 4–5, 1995, FINAT editor, Laan Copes Van Cattenburch, The Hague, Test Method 1). The peel force is expressed in N/25 mm.

3.1. EXAMPLE 1

This example illustrates the synthesis of emulsions of acrylic copolymers. The ingredients introduced into the reactor are shown in Table 1 hereinbelow (the amounts are expressed as % by weight). Different amounts of the compound Citroflex® are employed in preparing samples 1, 2 and 3, in order to obtain copolymers having variable flexibility.

TABLE 1

|  | Sample | | |
|---|---|---|---|
| A Initial charge | | | |
| distilled water | 16.67 | 16.46 | 16.18 |
| ammonium persulphate | 0.24 | 0.24 | 0.23 |
| B Preemulsion | | | |
| distilled water | 17.1 | 16.87 | 16.6 |
| Abex 26 S (anionic surfactant sold by Rhône-Poulenc) | 3.89 | 3.84 | 3.77 |
| Dow Fax 2Al (anionic surfactant sold by Dow Chemical) | 0.86 | 0.84 | 0.83 |
| 2-ethylhexyl acrylate | 47.26 | 46.62 | 45.85 |
| acrylic acid | 1.49 | 1.47 | 1.44 |
| trimethylolpropane trimethacrylate | 2.57 | 2.53 | 2.5 |
| Citroflex ® A4 (tri-n-butyl acetyl-citrate sold by Morflex) | 3.08 | 4.39 | 5.97 |
| C Catalytic solution | | | |
| distilled water | 6.7 | 6.61 | 6.5 |
| sodium formaldehydesulphoxylate | 0.14 | 0.13 | 0.13 |

A 4-necked 2-litre reactor, equipped with a stirrer, a condenser and a means for introducing the preemulsion, maintained beforehand under a nitrogen stream for 15 minutes, is used.

The initial charge (A) is introduced with stirring into the reactor, is maintained under a nitrogen stream for 20 minutes and then the temperature is raised to 50° C.

The preemulsion (B) is prepared in a separate round-bottomed flask and is maintained under a nitrogen stream for 20 minutes. When the temperature of the reactor is stable (50° C.), 0.5% by weight of the catalytic solution (C) is introduced and the polymerization is allowed to take place for 10 minutes. The temperature is raised to 70° C. and the remainder of the preemulsion (B) and the remainder of the catalytic solution (C) are introduced continuously and steadily over a period of 2.5 hours.

After the addition of the preemulsion (B) and of the catalytic solution (C), the reaction is allowed to continue at 80° C. for an additional 1 hour. The stirring is maintained throughout the duration of the preparation.

After cooling to room temperature, the pH of the emulsion obtained is adjusted to between 5 and 6 with an aqueous ammonia solution.

The physical characteristics of the emulsions obtained are collated n Table 2.

TABLE 2

| Sample | Citroflex ® A4 (% by weight) | Viscosity (mPa · s) | Size of the particles (nm) | Solids content (% by weight) |
|---|---|---|---|---|
| 1 | 3.08 | 580 | 330 | 56.0 |
| 2 | 4.39 | 480 | 330 | 55.7 |
| 3 | 5.97 | 135 | 340 | 56.7 |

Evaluation of the adhesive properties:

The emulsion is applied to silicone paper using a Meyer bar and the combined product is dried in an oven at 100° C. for 5 minutes. The dry adhesive is applied to paper intended for the manufacture of adhesive labels (paper stock) and transferred by pressure. The weight per unit area of the adhesive is of the order of 20 to 25 g/m². The combined product is left at room temperature under a relative humidity of 50% for 24 hours and applied to various substrates.

The values of the peel force at 180° after adhesion for 20 minutes and 24 hours are collated in Table 3.

TABLE 3

| | | Peel force (n/25 mm) | | |
|---|---|---|---|---|
| Sample | Time | Glass | Stainless steel | Perspex ® |
| 1 | 20 minutes | 2.3 | 1.9 | 2.7 |
|   | 24 hours | 3.9 | 4.1 | 4.5 |
| 2 | 20 minutes | 1.9 | 2.6 | 2.9 |
|   | 24 hours | 1.5 | 4.8 | 4.0 |
| 3 | 20 minutes | 3.5 | 1.5 | 1.6 |
|   | 24 hours | 5.0 | 3.3 | 2.1 |

The values of the peel force at 180° of the emulsions deposited on various substrates, after ageing for 20 hours at 70° C. and exposure in a chamber at 23° C.±2° C. and 50%±2% relative humidity for 1 hour, are collated in Table 4.

3.2. EXAMPLES 2 to 5 (COMPARATIVE)

The preparation is carried out under the conditions of Example 1, sample 2, except that Citroflex® A4 is replaced by 4.4% by weight of the following compound:

dibutyl phthalate: Example 2

Benzoflex® 50 (mixture of diethylene glycol dibenzoate and of dipropylene glycol dibenzoate; sold by Velsicol): Example 3 dioctyl adipate: Example 4 dibenzyl ether: Example 5.

The values of the peel force at 180° of the emulsions thus obtained deposited on various substrates, after ageing for 20 hours at 70° C. and exposure in a chamber at 23° C.±2° C. at 50%±2% relative humidity for 1 hour, are collated in Table 4.

What is claimed is:

1. A pressure-sensitive adhesive comprising an aqueous poly(meth)acrylate emulsion formed by a process comprising steps of: dissolving at least one compound of formula:

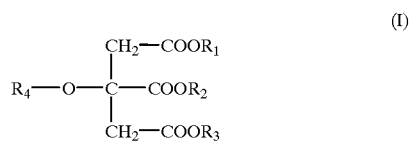

wherein:
 $R_1$, $R_2$ and $R_3$, which are identical or different, represent a linear or branched $C_1$–$C_8$ alkyl radical and
 $R_4$ represents H or an acyl radical $COR_5$ in which $R_5$ is a linear or branched $C_1$–$C_3$ alkyl radical
in a mixture of acrylic monomers comprising at least one alkyl (meth)acrylate, at least one polar copolymerizable monomer and at least one polyunsaturated copolymerizable monomer and polymerizing the monomers.

2. The adhesive according to claim 1, characterized in that the mixture comprises:
 85 to 98% by weight of alkyl (meth)acrylate
 1 to 5% by weight of polar copolymerizable monomer
 1 to 10% by weight of polyunsaturated copolymerizable monomer.

3. The adhesive according to claim 2, characterized in that the mixture comprises:
 90 to 95% by weight of alkyl (meth)acrylate
 2 to 4% by weight of polar copolymerizable monomer
 3 to 6% by weight of polyunsaturated copolymerizable monomer.

4. The adhesive according to claim 1, wherein the alkyl (meth)acrylate is chosen from the group consisting of acrylates and methacrylates wherein the alkyl radical contains 1 to 12 carbon atoms.

5. The adhesive according to claim 1, wherein the polar copolymerizable monomer is chosen from the group consisting of acrylic acid, methacrylic acid, dicarboxylic acids containing ethylenic unsaturation, acrylamide and methacrylamide.

6. The adhesive according to claim 1, wherein the polyunsaturated copolymerizable monomer is chosen from the group consisting of hexanediol diacrylate, hexanediol dimethacrylate, pentaerythritol diacrylate, pentaerythritol dimethacrylate, polyethylene glycol diacrylate, polyethyl-

TABLE 4

| | | Peel force (N/25 mm) | | | | | | |
|---|---|---|---|---|---|---|---|---|
| | | PEEL FORCE | | | | | | |
| Example | Sample | Glass | Stainless steel | Perspex ® | Polystyrene | Polypropylene | Low density polyethylene | High density polyethylene |
| 1 | 1 | 7.4 | 10.0 | 6.8 | 7.0 | 6.0 | 2.6 | 2.0 |
| 1 | 2 | 6.2 | 10.0 | 4.4 | 5.0 | 6.2 | 3.4 | 3.7 |
| 1 | 3 | 5.0 | 10.0 | 3.0 | 4.9 | 5.1 | 3.4 | 4.5 |
| 2 | — | P | P | P | P | 6.01 | 2.05 | 1.89 |
| 3 | — | P | P | P | P | 7.57 | 2.92 | 3.39 |
| 4 | — | P | P | 2.88 | 6.76 | 6.68 | 2.65 | 2.79 |
| 5 | — | 7.45 | 8.25 | P | P | P | P | P |

P: permanent adhesive: damage to the label during withdrawal ene glycol dimethacrylate, polypropylene glycol diacrylate, polypropylene glycol dimethacrylate, poly(ethylene)(propylene) glycol diacrylate, poly(ethylene)(propylene) glycol dimethacrylate, trimethylolpropane triacrylate and trimethylolpropane trimethacrylate.

7. The adhesive label comprising an adhesive according to claim 1.

8. The adhesive tape comprising an adhesive according to claim 1.

9. A pressure-sensitive adhesive which comprises an aqueous poly(meth)acrylate emulsion-comprising at least one compound of formula:

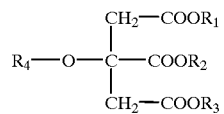

wherein:

$R_1$, $R_2$ and $R_3$, which are identical or different, represent a linear or branched $C_1$–$C_8$ alkyl radical and $R_4$ represents H or an acyl radical $COR_5$ in which $R_5$ is a linear or branched $C_1$–$C_3$ alkyl radical wherein the poly(meth)acrylate is resulted from an aqueous emulsion polymerization of a mixture of acrylic monomers in the presence of said formula comprising at least one alkyl(meth)acrylate, at least one polar copolymerizable monomer and at least one polyunsaturated copolymerizable monomer.

* * * * *